(12) United States Patent
Hara

(10) Patent No.: US 7,400,423 B2
(45) Date of Patent: Jul. 15, 2008

(54) METHOD, SYSTEM, AND RECORDING MEDIUM FOR PRINTING SERVICE

(75) Inventor: Makoto Hara, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 1537 days.

(21) Appl. No.: 09/773,629

(22) Filed: Feb. 2, 2001

(65) Prior Publication Data
US 2002/0051150 A1 May 2, 2002

(30) Foreign Application Priority Data
Feb. 4, 2000 (JP) ............................. 2000-027967
Jan. 16, 2001 (JP) ............................. 2001-007138

(51) Int. Cl.
G06F 3/12 (2006.01)
G06K 1/00 (2006.01)
(52) U.S. Cl. ...................................... 358/1.15; 358/1.9
(58) Field of Classification Search .......... 358/1.1–1.18
See application file for complete search history.

(56) References Cited

U.S. PATENT DOCUMENTS 6,886,028 B1 * 4/2005 Matsuyama et al. ......... 709/203

2002/0013784 A1 * 1/2002 Swanson
2002/0078160 A1 * 6/2002 Kemp et al.

* cited by examiner

Primary Examiner—Douglas Q. Tran
(74) Attorney, Agent, or Firm—Birch, Stewart, Kolasch & Birch, LLP

(57) ABSTRACT

In a printing service system for providing a service only to authenticated users by receiving authentication information from the users, authentication information issued by a service provider other than a provider of the printing service can be used. When a user who has not registered with the printing service system but has registered with a collaborating service provider uses the printing service, authentication information issued by the collaborating service provider is input from a personal computer to authentication means. The authentication means asks a system of the collaborating service provider about the authentication information and obtains information of affirmation or denial of the authentication information. Based on this result, the authentication means judges whether or not the user accessing the printing service system can receive the service. If the user is eligible for the service, the authentication means notifies printing service means of eligibility of the user for the service, and the printing service means provides the service to the user. If the user is not eligible for the service, the authentication means displays ineligibility of the user on the personal computer.

16 Claims, 3 Drawing Sheets

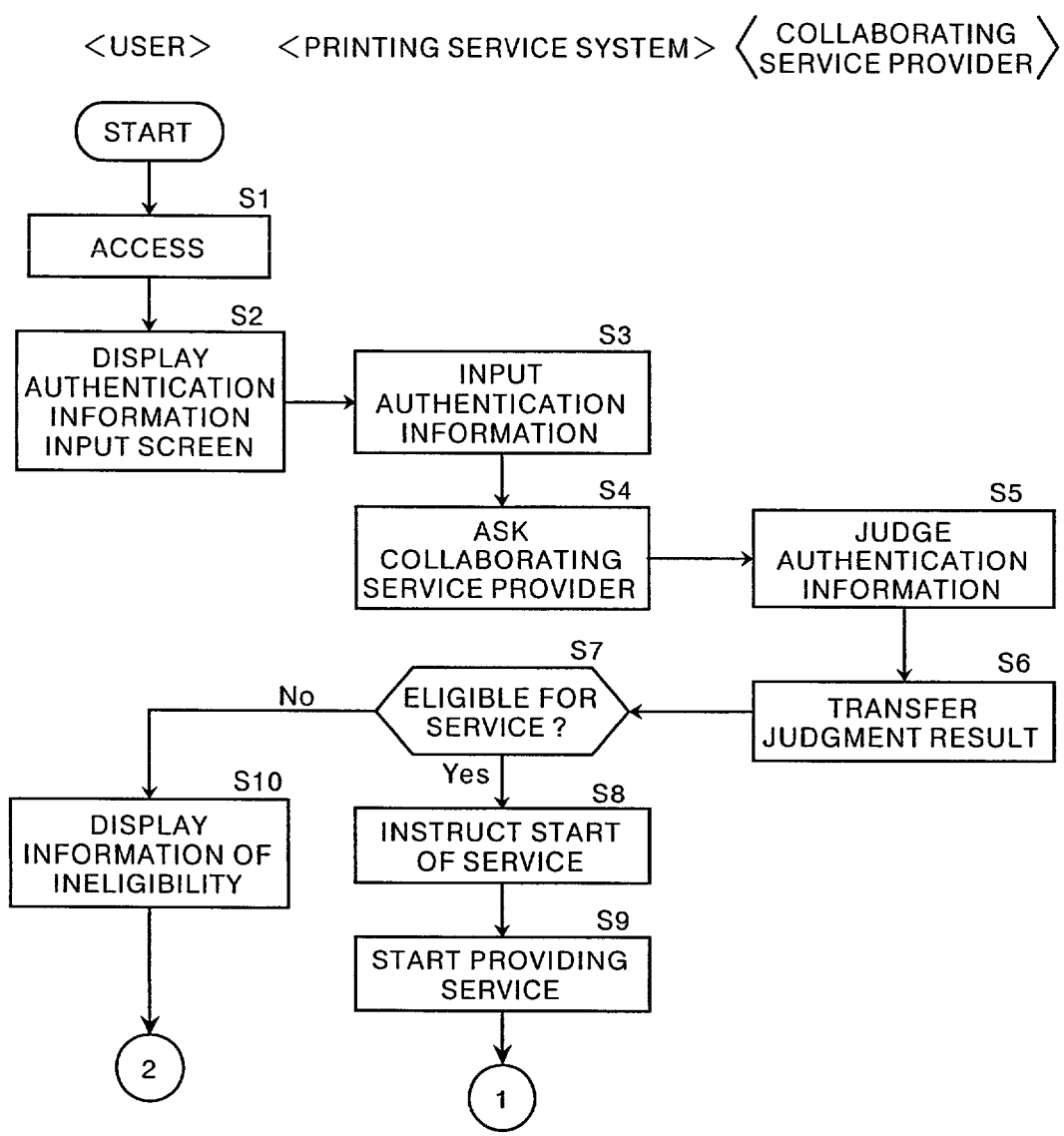

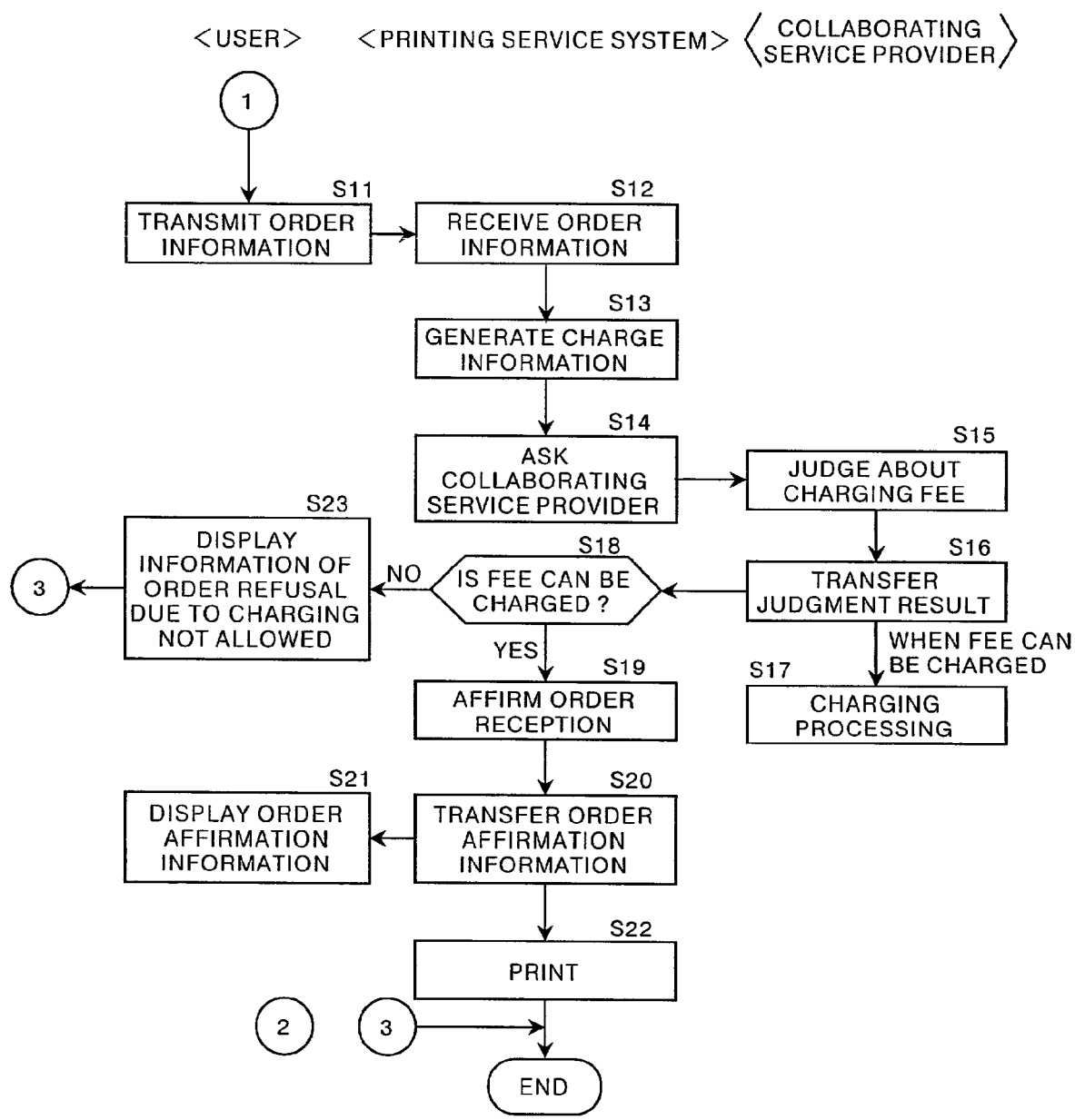

METHOD, SYSTEM, AND RECORDING MEDIUM FOR PRINTING SERVICE

BACKGROUND OF THE INVENTION

1. Field of the Invention

The present invention relates to a printing service method and a printing service system for providing a printing service to users via a network. The present invention also relates to a computer-readable recording medium storing a program to cause a computer to execute the printing service method.

2. Description of the Related Art

Digital photographic service systems for carrying out digital photographic services such as storing photographic images obtained by users in image servers after digitization of the images, providing the images to the users by recording the images in CD-Rs, and receiving orders for additional prints, have been known. As one form of such systems, a network photographic service system for storing (registering) users, digital images in a system of a service provider and receiving printing orders or the like via a network such as the Internet has also been proposed.

In such a network photographic service system, in order to provide digital photographic services to users, a server computer having a scanner, a printer, and a large-capacity disc (hereinafter called an image server) is installed in a wholesale laboratory. Photographs obtained by users are stored as image data in the image server. Alternatively, image data obtained by users are transferred to the image server. By enabling the users to access the image server via a network, various kinds of services, such as ordering an additional print, attaching a photographic image to an email message, and downloading of image data, are provided. In such a service, a user accesses the image server by using predetermined application software installed in his/her personal computer or in an order-placing apparatus installed in a DPE store or the like, and orders an additional print or the like on a screen of a Web site. Meanwhile, in the laboratory, photographic processing such as generation of an additional print, a picture postcard, an album, and a composite image, and trimming is carried out on image data based on order information from the user. Data after the processing are transferred to the user or an e-mail message notifying completion of the processing is sent to the user, for example.

The "order information" herein referred to is information such as a processing number indicating the content of a service (such as generation of an additional print or a postcard), an image number specifying a photograph, a print size, the quantity of prints, a quality of printing paper (such as glossy or non-glossy), a thickness of the paper, the content of photographic processing, and trimming specification, for example. The order information also includes information related to the user, such as the name, an address, and a phone number.

For reception of such a printing service, the user registers user information such as the name, the address, the phone number, and a credit-card number with a service provider and receives authentication information such as a user ID and a password. In order to use the printing service, the user accesses the image server of the service provider and inputs the authentication information on the screen of the Web site for providing the service. The Web screen becomes ready for input of order information and the printing service is provided.

However, the user may have registered himself/herself with various kinds of service providers such as an Internet provider, a mail-order service provider, and a mailing service provider, in addition to the printing service provider. Therefore, the user often has various items of authentication information. For this reason, the user has to use appropriate authentication information for each of the services, which is troublesome for the user. Furthermore, a desired service may not be received if the user forgets or erroneously memorizes a user ID or a password. Moreover, since the printing service system has original functions such as transfer of the order information and the image data, and preview of an image, a service provider not dedicated to the printing service has difficulty in entering the printing service.

SUMMARY OF THE INVENTION

The present invention has been conceived based on consideration of the above problems. An object of the present invention is therefore to provide a printing service method and a printing service system enabling provision of a printing service based on authentication information issued by a provider of a service other then the printing service, and to provide a computer-readable recording medium storing a program to cause a computer to execute the printing service method.

The printing service method of the present invention is a method of providing a printing service to a user according to a result of judgment as to whether or not the user is eligible for the service based on authentication information input from the user. The printing service method comprises the steps of:

asking a predetermined service provider about the authentication information if the authentication information is for the predetermined system; and judging whether or not the user is eligible for the service based on affirmation or denial of the authentication information by the predetermined system.

The "printing service" is a service for receiving an order for photographic processing such as generation of an additional print, a postcard, an album and a composite image via a network.

The predetermined system may be a service provider in collaboration with a provider of the printing service. However, the "predetermined system" may provide a service completely unrelated to the printing service.

In the printing service method of the present invention, it is preferable for the name of the predetermined system to be input at the time of receiving the authentication information so that the predetermined system can be specified based on the name. In this manner, a system of the printing service can ask the predetermined system about the authentication information.

As a method of inputting the name of the predetermined system, the name itself may be input. Alternatively, the name may be selected from a pull-down menu on a screen of a Web site of the printing service system. The name may also be selected by clicking on the name of the predetermined system displayed on the screen of the Web site.

Depending on the authentication information, the predetermined system can be specified only by glancing at the authentication information such as a combination of three alphabetic characters and five numbers as an ID. In such a case, it is preferable that the predetermined system is specified based on the authentication information so that the predetermined system can be asked about the authentication information.

Furthermore, it is preferable for the printing service method of the present invention to generate charge information for the printing service in the case where the user has been judged to be eligible for the service and to transfer the information to the predetermined system. In this manner, the predetermined system can charge the user based on the charge information.

The printing service system of the present invention is a printing service system for providing a printing service to a user according to a result of judgment as to whether or not the user is eligible for the printing service based on authentication information input from the user. The printing service system comprises:

authentication means for asking a predetermined system about the authentication information if the authentication information is for the predetermined system, and for judging whether or not the user is eligible for the service based on affirmation or denial of the authentication information by the predetermined system.

In the printing service system of the present invention, it is preferable for the authentication means to receive an input of the name of the predetermined system at the time of receiving the authentication information so that the authentication means can specify the predetermined system based on the name of the predetermined system. In this manner, the authentication means can ask the predetermined system. about the authentication information.

It is also preferable for the authentication means to specify the predetermined system based on the authentication information so that the authentication means can ask the predetermined system about the authentication information.

Furthermore, it is preferable for the printing service system of the present invention to further comprise fee charging means for generating charge information for the printing service in the case where the user has been judged to be eligible for the service and for transferring the charge information to the predetermined system so that the predetermined system can charge the user for the service based on the charge information.

The printing service method of the present invention may be provided as a program stored in a computer-readable recording medium to cause a computer to execute the method.

According to the present invention, if the authentication information input from the user is the authentication information for the predetermined system such as a service provider in collaboration with the provider of the printing service, the predetermined system is asked about the authentication information. The predetermined system judges whether the authentication information is affirmed or denied. Based on the affirmation or the denial, the user is judged to be eligible or not eligible for the service. If the authentication information is affirmed, the service is provided, while the service is not provided if the authentication information is denied. Therefore, the user can receive the printing service without having authentication information issued by the provider of the printing service system if the user has the authentication information for the predetermined system. In this manner, the user can reduce the number of authentication information items and avoid problems caused by using different authentication information for each service provider. The predetermined system can provide the printing service to the user without installing the system therefor. As a result, convenience for both the user and the service provider can be improved.

Furthermore, by receiving the name of the predetermined system at the time of receiving the authentication information, the predetermined system that has given the authentication information to the user can be specified easily based on the name of the system. Therefore, the user can be authenticated promptly.

Moreover, the service provider can be specified in some cases only by referring to the authentication information. In such a case, the predetermined system can be specified based on the authentication information. Therefore, the user can save time without inputting the name of the predetermined system.

By generating the charge information for the printing service in the case where the user has been judged to be eligible for the service and by transferring the information to the predetermined system, a fee charging system of the predetermined system can be used for charging the user for the printing service. Therefore, the user can avoid inputting his/her credit-card number on the screen of the Web site which is problematic in terms of security. In this manner, the user can receive the printing service without worrying about the security.

BRIEF DESCRIPTION OF THE DRAWINGS

FIG. 2 is a flow chart showing processing by the embodiment (part 1); and

FIG. 3 is a flow chart showing the processing by the embodiment (part 2).

DESCRIPTION OF THE PREFERRED EMBODIMENT

Figure 1:
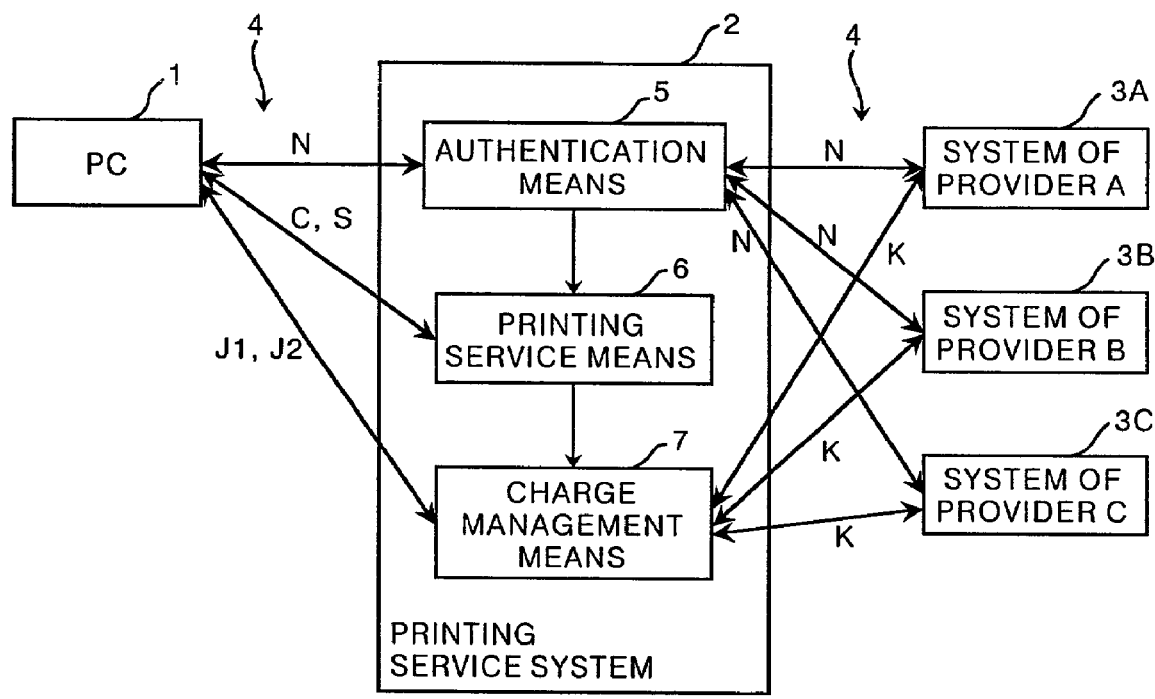
FIG. 1 is a block diagram showing a configuration of a printing system as an embodiment of the present invention.

Hereinafter, an embodiment of the present invention will be explained with reference to the accompanying drawings.

FIG. 1 is a block diagram showing a configuration of a printing system adopting a printing service system as the embodiment of the present invention. As shown in FIG. 1, the printing system in this embodiment comprises a personal computer 1 owned by a user, a printing service system 2, and systems 3A~3C of service providers A, B, and C in collaboration with the printing service system 2, all of which are connected to each other via a network 4. The personal computer 1 stores image data S owned by the user. The user describes the content of an order for printing the image data S as order information C by using the personal computer 1, which will be explained later. The user transfers the order information C and the image data S to the printing service system 2. The user is assumed not to have authentication information for a company providing the printing service system, and assumed to have only authentication information for one of the collaborating service providers.

The printing service system 2 provides a printing service to users. The printing service system 2 comprises authentication means 5 for verifying authentication information N transferred from the personal computer 1 of the user, printing service means 6 for providing the printing service, and charge management means 7 for charging for the printing service.

The authentication means 5 judges whether or not the user is eligible for the printing service, based on the authentication information N comprising a user ID and a password transferred from the personal computer 1 of the user. In the case where the user does not have authentication information issued by the company providing the printing service system, the authentication means 5 asks the systems 3A~3C of the service providers A, B, or C about authentication and judges whether or not the user is eligible for the printing service based on affirmation or denial of the authentication. When the user accesses a Web site of the printing service system 2 by using the personal computer 1, a screen for inputting the authentication information N is displayed on the personal computer 1. The user inputs the authentication information N on this screen.

The printing service means 6 provides the printing service to the user when the authentication means 5 affirms authentication of the user. More specifically, a Web screen for receiving the order information C is displayed on the personal computer 1, and the order information C and the image data S are transferred from the personal computer 1. The image data S are then printed based on the order information C.

The charge management means 7 generates charge information K for the printing service by the printing service means 6 and charges the user through the collaborating service providers by asking the systems 3A~3C of the collaborating service providers A, B, or C whether or not the printing service system 2 can charge the user for the service. If the printing service system can charge, the charge management means 7 receives the order and transmits order affirmation information J1 indicating affirmation of the order. If the printing system cannot charge, the charge management means 7 transmits information J2 indicating that the order cannot be received.

The service providers A, B, and C in collaboration with the printing service system 2 are companies for providing various kinds of services, such as an Internet provider, a mail-order company, and a mailing service company. The service providers A, B, and C are in collaboration with the printing service system 2 by making contracts with the company providing the printing service system so that the service of the printing service system 2 can be provided to users who have registered with the collaborating service providers. In the case where the authentication information N input to the authentication means 5 of the printing service system 2 has been issued by one of the collaborating service providers, the authentication means 5 asks the system of the service provider about the authentication information N and authenticates the user accessing the printing service system 2.

Operation of this embodiment will be explained next. FIGS. 2 and 3 are flow charts showing the operation of this embodiment. Assume that the user does not have authentication information for the printing service system 2 but only has authentication information issued by the service provider A which is one of the collaborating service providers. The user 1 accesses the printing service system 2 by using a Web browser installed in the personal computer 1 (Step S1). At this time, the Web browser displays the screen for inputting the authentication information of the user (Step S2). The user inputs the authentication information N on this screen. The input screen is set for inputting a user ID, a password, and the name of the service provider with which the user has registered. The name of the service provider can be input together with the user ID and the password. It is preferable for the name of the service provider to be selected by using a pull-down menu or clicking, for example.

After the authentication information N has been input, the information is input to the authentication means 5 of the printing service system 2 (Step S3). The authentication means 5 refers to the name of the collaborating service provider included in the authentication information N and asks the service provider about the authentication information N (Step S4). In this embodiment, the user has registered with the service provider A. Therefore, the authentication means 5 asks the service provider A about the authentication information N. The system 3A of the service provider A judges whether or not the authentication information N is authenticated (Step S5), and transfers a result of the judgment to the authentication means 5 (Step S6).

The authentication means 5 judges whether or not the user is eligible for the printing service, based on the judgment result from the system 3A of the service provider A (Step S7). If a result at Step S7 is affirmative, the authentication means 5 transfers an instruction to start the printing service to the printing service means 6 (Step S8). The printing service means 6 displays on the personal computer 1 the Web screen for receiving the input of the order information C, and starts the printing service (Step S9). At this time, the Web screen displayed on the personal computer 1 can be a Web screen of the company providing the printing service system 2. However, a Web screen similar to a Web screen of the collaborating service provider that the user has registered with may be displayed on the personal computer 1.

Meanwhile, if the result at Step S7 is negative, the authentication means 5 displays on the personal computer 1 a notice indicating ineligibility of the user for the printing service (Step S10), and ends the procedure.

After the service provision is started, the user transmits the order information C to the printing service system 2 (Step S11), and the printing service system 2 receives the order information C (Step S12). In the printing service system 2, the charge management means 7 generates the charge information K (Step S13), and asks the collaborating service provider (company A) about whether or not a fee can be charged (Step S14). The system 3A of the company A judges whether the fee can be charged (Step S15), and transfers a judgment result to the printing service system 2 (Step S16). If the fee can be charged, the charge management means 7 carries out fee charging processing such as issuing a bill to the user and charging the fee to a credit card of the user (Step S17).

In the printing service system 2, the judgment result from the system 3A of the company A is judged (Step S18), and affirms the order if the fee is charged (Step S19). The order affirmation information J1 indicating the order affirmation is then sent to the personal computer 1 of the user (Step S20). The information indicating the order affirmation is displayed on the personal computer 1 of the user (Step S21). Thereafter, the image data S are printed by the printing service means 6 of the printing service system 2 (Step S22), and the procedure ends. Meanwhile, if the judgment result at Step S18 is negative, the information J2 indicating that the order cannot be received since the printing system cannot charge the fee is transferred to the personal computer 1 of the user, and the information is displayed (Step S23) to end the procedure.

As has been described above, the user can receive the printing service without having the authentication information issued by the company providing the printing service system 2, as long as the user has the authentication information issued by one of the collaborating service providers. Therefore, the user can reduce the number of authentication information items he/she uses, and does not need to use different authentication information for each service. The collaborating service providers can provide the printing service to their users without installing the system to provide the printing service. Therefore, convenience for both the user and the collaborating service providers can be improved.

If the name of the collaborating service provider of the user is received when the authentication information is input, the collaborating service provider that has issued the authentication information to the user can be easily specified based on the name. Therefore, the user can be authenticated promptly.

In the case where the user has been judged to be eligible for the service, the charge information for the printing service is generated and transferred to the collaborating service provider. In this manner, a fee charging system of the collaborating service provider can be used for charging the user for the printing service fee. Therefore, the user can safely receive the printing service without inputting his/her credit card number on the Web screen which is problematic in terms of security.

In the above embodiment, the name of the collaborating service provider is input when the authentication information N is input. However, depending on the authentication information N, the collaborating service provider can be specified easily by simply referring to the authentication information, such as in the case of a combination of three alphabetic and five numbers as the ID. In such a case, the collaborating service provider can be specified easily by the input of the authentication information N, whereby the user is saved from the problem of inputting the name. In this manner, convenience for the user can be improved.

What is claimed is:

1. A method of providing a printing service to a user according to a result of judgment as to whether or not the user is eligible for the printing service based on authentication information input from the user, the printing service method comprising the steps of:
    asking a collaborating system about the authentication information if the authentication information is associated with the collaborating system; and
    judging whether or not the user is eligible for the printing service based on affirmation or denial of the authentication information by the collaborating system,
    wherein the user is capable of accessing the printing service via authentication information associated with the collaborating system.

2. A printing service method as defined in claim 1, the step of asking further comprising the steps of:
    receiving a name of the collaborating system at the time of receiving the authentication information; and
    specifying the collaborating system associate with the name and asking the specified collaborating system to verify the authentication information.

3. A printing service method as defined in claim 1, the step of asking further comprising the steps of:
    specifying the collaborating system associated with the authentication information and asking the specified collaborating system to verify the authentication information.

4. A printing service method as defined in any one of claims 1 to 3, further comprising the steps of:
    generating charge information for the printing service in the case where the user has been judged to be eligible for the printing service and transferring the information to the collaborating system; and
    charging the user for the printing service based on the charge information by using the collaborating system.

5. A printing service system for providing a printing service to a user according to a result of judgment as to whether or not the user is eligible for the printing service based on authentication information input from the user, the printing service system comprising:
    authentication means for asking a collaborating system about the authentication information if the authentication information is associated with the collaborating system, and for judging whether or not the user is eligible for the printing service based on affirmation or denial of the authentication information by the collaborating system,
    wherein the user is capable of accessing the printing service via authentication information associated with the collaborating system.

6. A printing service system as defined in claim 5, the authentication means receiving an input of a name of the collaborating system at the time of receiving the authentication information, and specifying the collaborating system based on the name of the collaborating system, and asking the specified collaborating system to verify the authentication information.

7. A printing service system as defined in claim 5, wherein the authentication means specifies the collaborating system associated with the authentication information and asks the specified collaborating system to verify the authentication information.

8. A printing service system as defined in any one of claims 5 to 7, the printing service system further comprising fee charging means for generating charge information for the printing service in the case where the user has been judged to be eligible for the printing service and for transferring the charge information to the collaborating system, wherein
    the collaborating system charges the user for the printing service based on the charge information.

9. A computer-readable recording medium storing a program to cause a computer to execute a method of providing a printing service to a user according to a result of judgment as to whether or not the user is eligible for the printing service based on authentication information input from the user, the program comprising the procedures of:
    asking a collaborating system associated with the authentication information if the authentication information is for the collaborating system; and
    judging whether or not the user is eligible for the printing service based on affirmation or denial of the authentication information by the collaborating system,
    wherein the user is capable of accessing the printing service via authentication information associated with the collaborating system.

10. A computer-readable recording medium as defined in claim 9, the procedure of asking further comprising the procedures of:
    receiving a name of the collaborating system at the time of receiving the authentication information; and
    specifying the collaborating system based on the name and asking the specified collaborating system to verify the authentication information.

11. A computer-readable recording medium as defined in claim 9, the procedure of asking further comprising the procedures of:
    specifying the collaborating system associated with the authentication information and asking the specified collaborating system to verify the authentication information.

12. A computer-readable recording medium as defined in any one of claims 9 to 11, the program further comprising the procedures of:
    generating charge information for the printing service in the case where the user has been judged to be eligible for the printing service and transferring the charge information to the collaborating system.

13. A method of providing a printing service to a user according to a result of judgment as to whether or not the user is eligible for the printing service based on authentication information input from the user, the printing service method comprising the steps of:
    choosing from a plurality of collaborating systems;
    asking a chosen collaborating system about the authentication information if the authentication information is associated with the collaborating system; and judging whether or not the user is eligible for the printing service based on affirmation or denial of the authentication information by the chosen collaborating system, wherein the user is capable of accessing the printing service via authentication information that is associated with at least one of a plurality of collaborating systems.

14. A printing service system for providing a printing service to a user according to a result of judgment as to whether or not the user is eligible for the printing service based on authentication information input from the user, the printing service system comprising:

authentication means capable of asking a plurality of collaborating systems about the authentication information if the authentication information is associated with at least one of the. plurality of collaborating systems, and for judging whether or not the user is eligible for the printing service based on affirmation or denial of the authentication information by the appropriate collaborating system, wherein the user is capable of accessing the printing service via authentication information associated with a selected one of the collaborating system from the plurality of collaborating systems.

15. A computer-readable recording medium storing a program to cause a computer to execute a method of providing a printing service to a user according to a result of judgment as to whether or not the user is eligible for the printing service based on authentication information input from the user, the program comprising the procedures of:

choosing from a plurality of collaborating systems;

asking a chosen collaborating system associated with the authentication information if the authentication information is for the chosen collaborating system; and judging whether or not the user is eligible for the printing service based on affirmation or denial of the authentication information by the chosen collaborating system, wherein the user is capable of accessing the printing service via authentication information that is associated with at least one of a plurality of collaborating systems.

16. A service system for providing a service to a user according to a result of judgment as to whether or not the user is eligible for the service based on authentication information input from the user, the service system comprising:

authentication means capable of asking a plurality of collaborating systems about the authentication information if the authentication information is associated with at least one of the plurality of collaborating systems, and for judging whether or not the user is eligible for the service based on affirmation or denial of the authentication information by the appropriate collaborating system, wherein the user is capable of accessing the service via authentication information associated with a selected one of the collaborating system from the plurality of collaborating systems.

* * * * *